J. J. HESER.
CORN HUSKER.
APPLICATION FILED JUNE 21, 1917.
1,239,913.
Patented Sept. 11, 1917.
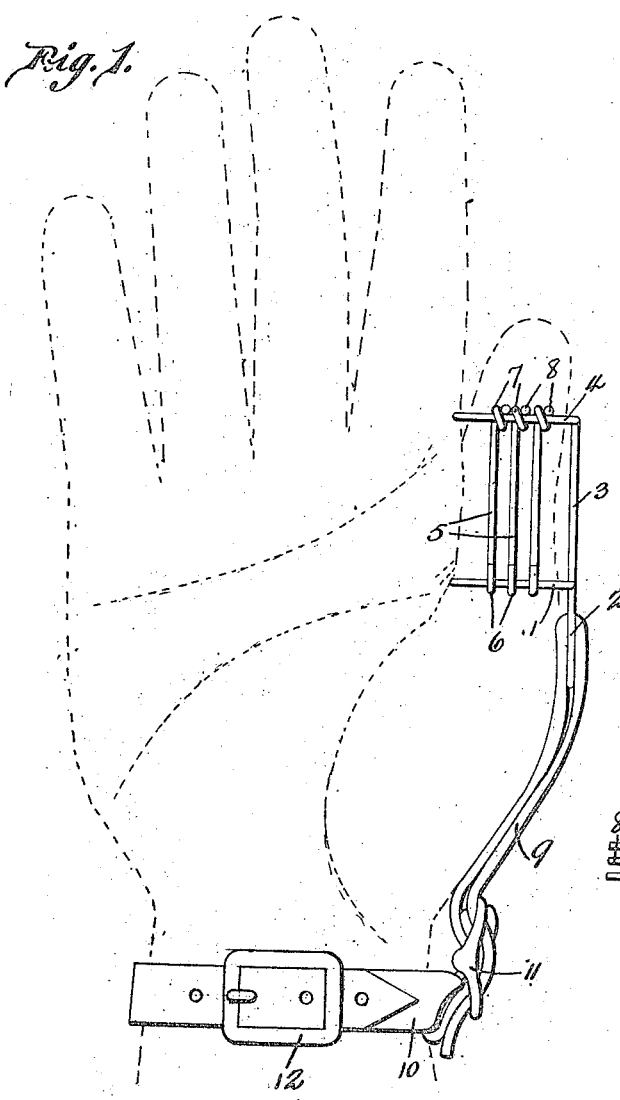
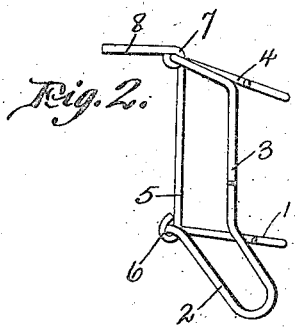
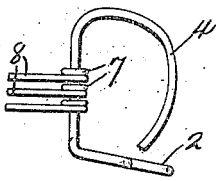
J. J. Heser, Inventor

UNITED STATES PATENT OFFICE.

JOHN J. HESER, OF TAMORA, NEBRASKA.

CORN-HUSKER.

1,239,913.　　　　Specification of Letters Patent.　　Patented Sept. 11, 1917.

Application filed June 21, 1917.　Serial No. 176,169.

*To all whom it may concern:*

Be it known that I, JOHN J. HESER, a citizen of the United States, residing at Tamora, in the county of Seward and State of Nebraska, have invented a new and useful Corn-Husker, of which the following is a specification.

The subject of this invention is a corn husker wherein husk engaging prongs are mounted on suitable hand attaching means; and the objects of the invention are first, to provide a corn husker adapted to be applied to the hand, second, to provide a corn husker which is adjustable to fit the hand, third, to provide a simple and efficient corn husker.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

A practical embodiment of the invention is shown in the accompanying drawing, wherein:

Figure 1 is a view in elevation of the husker attached to a hand.

Fig. 2 is a side elevation of the husker with the attaching strap removed.

Fig. 3 is a plan view of the same.

Referring to the drawings by numerals of reference:

The husker is preferably formed of suitable wire, bent at one end to form a thumb encircling loop 1 which merges into a rearwardly sloping strap engaging offset 2. A supporting or spacing bar 3 extends from the offset 2 and supports, at its upper end, a thumb encircling loop 4.

Spacing rods or wires 5, have one of their ends bent about the loop 1, as at 6, or otherwise secured thereto. These wires extend between the loops 1 and 4, and are turned about the loop 4, as at 7, leaving projecting ends or prongs 8.

An attaching strap 9 is passed through the offset 2 and looped about a wrist encircling strap 10. These straps may be supplied with the usual buckles 11 and 12, respectively, for the purpose of adjustably securing the straps in place.

In practice the device is operated as follows: The thumb is inserted through the loops 1 and 4, the loop being bent inwardly or outwardly to fit the thumb. The strap 10 is buckled about the wrist, and the strap 9 adjusted to retain the husker on the thumb. The ear of corn is then held in one hand and the hand on which the husker is attached drawn along the ear with the thumb pressed in to engage the prongs with the husks and grapple and remove them from the ear of corn.

Having thus described the invention, what is claimed as new and sought by Letters Patent, is:

1. A corn husker, comprising a thumb encircling loop, an offset sloping rearwardly from the loop, a supporting bar rising from the offset, another thumb encircling loop supported on the bar, prongs projecting from the last mentioned loop, and attaching means secured to the offset.

2. A corn husker, comprising a thumb encircling loop, an offset sloping rearwardly from the loop, a supporting bar extending from the offset, another loop supported on the bar, spacing bars secured to and extending between the loops, prongs projecting from one end of the spaced bars, and means engaging the offset for securing the husker in place upon a hand.

In testimony that I claim the foregoing as my own, I have hereto affixed my signature in the presence of two witnesses.

JOHN J. HESER.

Witnesses:
J. H. BRIGHT,
J. Q. HERROLD.

Copies of this patent may be obtained for five cents each, by addressing the "Commissioner of Patents, Washington, D. C."